US007282665B2

(12) United States Patent
Chen et al.

(10) Patent No.: US 7,282,665 B2
(45) Date of Patent: Oct. 16, 2007

(54) METHOD AND APPARATUS FOR PROCESSING ARTICLES WITH A LASER BEAM

(75) Inventors: Jie-Wei Chen, Alpnach Dorf (CH); Adolf Niederberger, Kaegiswil (CH)

(73) Assignee: Leister Process Technologies (CH)

( * ) Notice: Subject to any disclaimer, the term of this patent is extended or adjusted under 35 U.S.C. 154(b) by 179 days.

(21) Appl. No.: 10/667,926

(22) Filed: Sep. 22, 2003

(65) Prior Publication Data

US 2004/0065406 A1    Apr. 8, 2004

(30) Foreign Application Priority Data

Oct. 2, 2002  (EP) .................................. 02022072

(51) Int. Cl.
*B23K 26/20* (2006.01)
*B23K 65/16* (2006.01)
(52) U.S. Cl. ........................... 219/121.67; 219/121.72; 219/121.82; 156/272.8
(58) Field of Classification Search ........... 219/121.63, 219/121.64, 121.82, 121.85, 121.86; 156/272.8, 156/379.8; 228/212; 269/287; 264/400
See application file for complete search history.

(56) References Cited

U.S. PATENT DOCUMENTS

| | | | | |
|---|---|---|---|---|
| 3,942,778 A | * | 3/1976 | Fadiga et al. .................. | 269/26 |
| 4,095,232 A | * | 6/1978 | Cha .............................. | 347/75 |
| 4,200,272 A | * | 4/1980 | Godding ....................... | 269/26 |
| 4,543,970 A | * | 10/1985 | Noh et al. ..................... | 134/62 |
| 4,992,133 A | * | 2/1991 | Border ......................... | 156/498 |
| 5,152,707 A | * | 10/1992 | Dougherty et al. ........... | 445/52 |
| 5,162,008 A | * | 11/1992 | Steiner et al. ................ | 445/30 |
| 5,239,156 A | * | 8/1993 | Jones et al. ............ | 219/121.63 |

(Continued)

FOREIGN PATENT DOCUMENTS

EP    0 997 261    5/2000

(Continued)

OTHER PUBLICATIONS

Beringer et al., "Workpiece Clamp for laser machining—has laser transparent clamp plate with grooves for gas flow between input and outlet in base", Jul. 20, 1988, Derwent-acc-No. 1988-324055, Abstracted Pub No. DD258386A.*

(Continued)

*Primary Examiner*—Samuel M. Heinrich
(74) *Attorney, Agent, or Firm*—Bachman & LaPointe, P.C.

(57) ABSTRACT

A method for joining workpieces by welding with laser light, in which a plurality of workpieces are arranged between a lower pressure plate and a translucent upper pressure plate on a multiplicity of supporting segments movable in a vertical direction, whereby the workpieces are subsequently exposed through the upper pressure plate to a laser beam. The workpieces on the supporting are pressed together and towards the upper plate with a prescribed contact pressure, the spacing of the supporting segments from the upper pressure plate being set variably and independently from each other. A device for joining workpieces by welding with laser light, comprises at least one upper pressure plate of transparent material and a lower pressure plate with multiplicity supporting segments for the workpieces. The supporting segments are arranged side by side on the lower plate and are movable in a vertical direction by compressed air and can be set independently from each other.

10 Claims, 5 Drawing Sheets

U.S. PATENT DOCUMENTS

| | | | |
|---|---|---|---|
| 5,272,307 A * | 12/1993 | Jones | 219/121.6 |
| 5,525,776 A * | 6/1996 | Okamoto | 219/121.68 |
| 5,760,367 A * | 6/1998 | Rosenwasser et al. | 219/121.69 |
| 5,808,641 A * | 9/1998 | Miyagawa et al. | 347/65 |
| 5,884,906 A * | 3/1999 | Morse | 269/266 |
| 5,899,445 A * | 5/1999 | Kimble | 269/21 |
| 5,906,364 A * | 5/1999 | Thompson et al. | 269/22 |
| 6,031,199 A * | 2/2000 | Ream et al. | 219/121.63 |
| 6,086,468 A * | 7/2000 | Yoshida et al. | 452/14 |
| 6,202,999 B1 * | 3/2001 | Wayman et al. | 269/309 |
| 6,210,507 B1 * | 4/2001 | Hansen et al. | 156/109 |
| 6,397,465 B1 * | 6/2002 | Akhavain et al. | 29/890.1 |
| 6,568,868 B1 * | 5/2003 | Hammer | 403/31 |
| 2001/0028567 A1 * | 10/2001 | Akiyama et al. | 362/520 |
| 2002/0191058 A1 * | 12/2002 | Anderson et al. | 347/86 |
| 2004/0068227 A1 * | 4/2004 | Baylis et al. | 604/103 |

FOREIGN PATENT DOCUMENTS

JP  04243244 A  *  8/1992

OTHER PUBLICATIONS

Chizhik et al., "Thermoplastic-material laser welding . . . transparent pressure plates which allow laser welding beam to pass through", Apr. 30, 1994, Derwent-acc-No. 1995-029080, Abstracted Pub No. RU2011530C.*

* cited by examiner

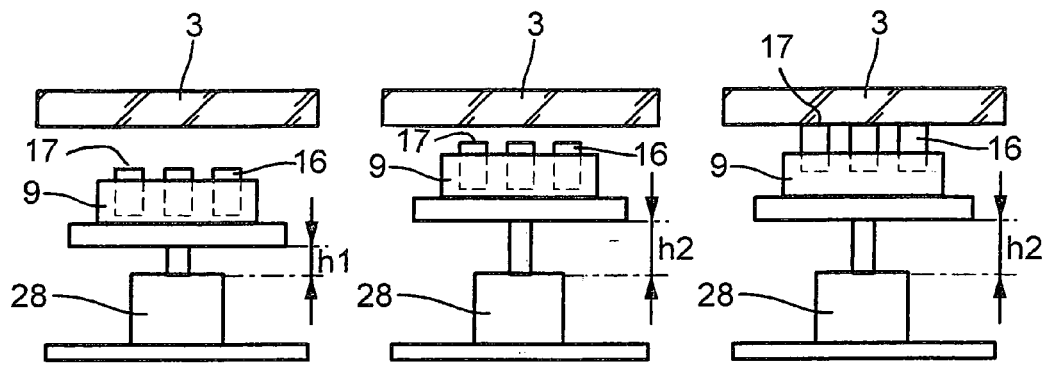
Fig. 4A   Fig. 4B   Fig. 4C
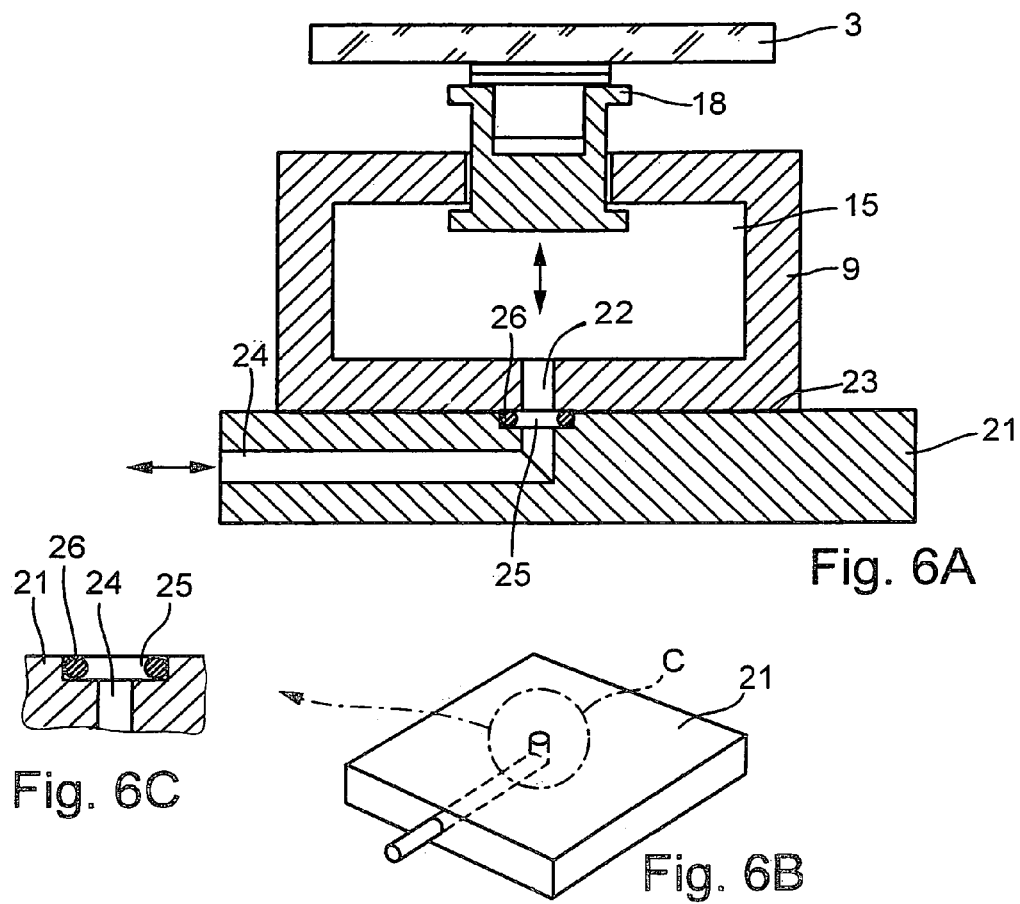
Fig. 6A
Fig. 6C
Fig. 6B

Fig. 7A                    Fig. 7B

METHOD AND APPARATUS FOR PROCESSING ARTICLES WITH A LASER BEAM

TECHNICAL FIELD OF THE INVENTION

The present invention relates to a method for machining workpieces by means of a laser beam, the workpieces being fixed and subsequently exposed at least partially to a laser beam. The invention further relates to a device for machining workpieces, having a laser source, a support as lower pressure plate for the workpieces, and a beam-passing upper plate on the workpieces for fixing the workpieces during the machining as upper pressure plate.

BACKGROUND OF THE INVENTION

This method of plastics welding with the aid of a laser beam is generally known, and is also denoted as transmission welding. It is important for this plastics welding method that the workpieces are clamped to one another during the welding operation, since an important precondition for a good welded joint of the plastics by means of laser radiation is not only the energy dose, but also the clean mechanical contact between the two adherend surfaces to be connected to one another. Various methods and devices which permit an adequate contact pressure, in particular with flat parts, are known for this purpose.

It is possible in principle not only to weld these parts to one another, but also to undertake other machining processes by means of a laser beam, such as are described, for example, in the dependent European patent application 02 001 768.7.

It is important for machining with the requisite precision that differences in contact pressure and component tolerances between the lower pressure plate and the upper pressure plate and the workpieces situated therebetween are balanced out so that each component has the same contact pressure conditions.

It is therefore the object of the present invention to propose here a possibility with the aid of which these high-precision parts can be produced quickly and rationally, there being at the same time a balancing of the contact pressure differences and component tolerances.

SUMMARY OF THE INVENTION

This object is achieved according to the invention by providing a method for machining workpieces by means of a laser beam, the workpieces being fixed and subsequently exposed at least partially to a laser beam, wherein in a first operating step a plurality of workpieces to be machined are mounted on a lower pressure plate having supporting segments that can be moved in a vertical direction, the top sides of the workpieces are brought into contact in the second operating step with a beam-passing plate as upper pressure plate, the upper and lower pressure plates are pressed together with a prescribed contact pressure, the spacing of the supporting segments from the upper plate being set variably, the workpieces to be machined are subsequently exposed to the laser beam through the upper pressure plate between the upper pressure plate and the lower pressure plate. The invention further includes a device for machining workpieces by means of a laser beam, having a laser source a support as lower pressure plate for the workpieces, and a beam-passing upper plate on the workpieces for fixing the workpieces during the machining, and also a pressure generator which acts on at least one of the pressure plates, wherein the lower pressure plate has a plurality of workpiece supports for holding the workpieces to be machined, which can be moved in a vertical direction relative to the lower pressure plate and whose spacing from the upper pressure plate can be variably set for the same contact pressure.

In accordance with the method, in a first operating step, a plurality of workpieces to be machined are mounted on a support as lower pressure plate having supporting segments that can be moved at least in a vertical direction. For this purpose, the individual workpieces are respectively laid onto the supporting segments such that the latter are all positioned at the same time, and can also be fixed, at least partially. In the next operating step, a beam-passing plate, for example made from glass, is brought into contact with the workpieces as upper pressure plate. Depending on the configuration of the method according to the invention, this can be performed only by loading, that is to say moving the upper pressure plate onto the upper workpiece, or by moving the workpieces up from below onto the upper pressure plate. Subsequent to this, the upper and lower pressure plates are pressed together at a prescribed contact pressure. In this case, the spacing of the supporting segments, which can be moved in a vertical direction, from the upper plate is set variably such that the tolerances of the workpieces are balanced out, and yet the same contact pressure is applied to all the workpieces. The clamping can be performed in this case in such a way that either only individual supporting segments of the lower pressure plate are clamped selectively with the workpieces currently to be machined between the upper pressure plate and the respective supporting segment and exposed to the laser beam, or the requisite contact pressure is applied simultaneously to all the supporting segments. Thus, in the case of the selective application of contact pressure, the two workpieces are therefore pressed together only then and at the respective workpieces which are currently being swept over by the laser beam. All the remaining workpieces located on the lower pressure plate remain only slightly prestressed and are not clamped between the upper pressure plate and the respective supporting segment until the moment of machining.

This method has the advantage that it is suitable for producing large masses of workpieces. For example, the fitting can be performed by means of an exchangeable magazine, the result being to reduce the production time. By being clamped, the individual parts can be machined with adequate quality with regard to the accuracy of the weld seam despite possible fluctuations in the height of the workpieces.

In accordance with a further advantageous refinement of the invention, individual segment regions of a supporting element are pressed against the workpieces with an appropriately prescribable contact pressure. These individual segment regions can be defined, for example, mechanically, pneumatically, hydraulically, by servomotor or magnetically and by means of individual needles, rollers, pins, platens etc. The design of these individual segment regions is determined by the type of application and the workpieces to be processed. In the case of the use of individual supporting elements such as, for example, needles, it is possible to press together parts which are uneven, for example have a contour, on the side facing the lower pressure plate.

In accordance with a further design of the method, the respective supporting segment is moved in a vertical direction with a first contact pressure until contact occurs with the upper pressure plate, and is pressed against the upper pressure plate, and then a second, substantially higher contact pressure is subsequently applied to it during the laser beam machining. Of course, it is also possible for a plurality of supporting segments to be moved simultaneously in such a way. This has the advantage that it is possible thereby for the exchange to be implemented easily in terms of design for a second, already fitted lower plate after the lower plate has been machined by laser beam. This exchange magazine method substantially increases the production throughput at a welding device.

For this purpose, the lower plate is advantageously provided from the underside with a compressed-air connection and arranged on a base plate with a compressed-air counterpart and pressed against the base plate with the force that is produced by the second, substantially higher contact pressure against the upper pressure plate, and the compressed-air connection is thereby sealed.

In accordance with a further design of the method, a beam-passing elastic plastic film is inserted between the upper pressure plate and the workpieces as compensating element. Consequently, possible differences in contact pressure and component tolerances can be balanced out during pressing together. The insertion of such a plastic film can additionally be carried out in the case of moveably mounted supporting segments, or else in the case of a rigid lower pressure plate.

The device for machining workpieces has a lower pressure plate with a plurality of supporting segments that are mounted moveably in a vertical direction relative to the lower pressure plate and whose spacing form the upper pressure plate can be variably set for the same contact pressure. The size of the supporting segments can correspond especially to the size of the workpieces to be machined and/or to be welded. The mobility can be effected by resilient bearing such that the individual supporting segments can be adapted to possible manufacturing tolerances. For the purposes of optimum adaptation to the workpiece dimensions, the individual supporting segments can be designed such that they can be controlled separately from one another or else in groups in the vertical direction by means of the pressure generator and can be moved in the vertical direction. As a result, an appropriate spacing is set up between the pressing parts (supporting segment and upper pressure plate) for each set of workpieces.

In accordance with a further design, the device has supporting segments that have individual segment regions which can move in the vertical direction. These can be formed, in turn, by relatively small pins, clips, rollers, pistons with an appropriate supporting surface or the like. The advantage of this arrangement consists in that it is possible to realize an adaptation coordinated with the application.

If the workpieces are pressed together only at the instant of welding, an appropriate control device ensures that the respective supporting segment presses precisely the workpieces struck by the laser beam.

In accordance with a preferred design of the device according to the invention, the lower pressure plate is designed as a pressure chamber to which compressed air can be applied and which has one or more workpiece supports, for example pistons with a large supporting surface, pins, needles, that can be moved in a vertical direction. The workpiece supports can be driven individually, separately from one another. It is also possible for the lower pressure plate to have individual resiliently mounted workpiece supports for it to be possible to move the pressure plate in a vertical direction.

In a further design of the invention the lower pressure as pressure chamber, for example for compressed air, at least two such lower plates are provided which can be brought alternately into pressure contact with the upper plate as changing magazine. Preferably, the lower plate has on the underside a compressed-air opening that is flush with a corresponding compressed-air opening in a base plate arranged thereunder.

Preferably, the compressed-air opening in the lower plate is designed as a through bore, and the compressed-air opening in the base plate is designed as a bore with a counterbore for holding a seal. This permits a particularly simple sealing without additional hoses or valves. The seal arranged in the counterbore is pressed together by the weight of the lower plate and thereby seals at a low pressure. This pressure is, however, sufficient to move the supporting segments, which can move in a vertical direction, against the upper pressure plate. Given the subsequently increased contact pressure, the lower pressure plate is pressed with just this increased contact pressure against the base plate such that an increased level of sealing is thereby also ensured.

BRIEF DESCRIPTION OF THE DRAWINGS

The invention is explained in more detail below with the aid of exemplary embodiments in conjunction with the accompanying drawings, in which:

FIG. 4 shows a sketch of a functional principle with a lower pressure plate with a compressed-air chamber, FIG. 6 shows the sectional illustration of a lower pressure plate on a base plate with the compressed-air connection for the changing magazine.

DETAILED DESCRIPTION

Figure 1:
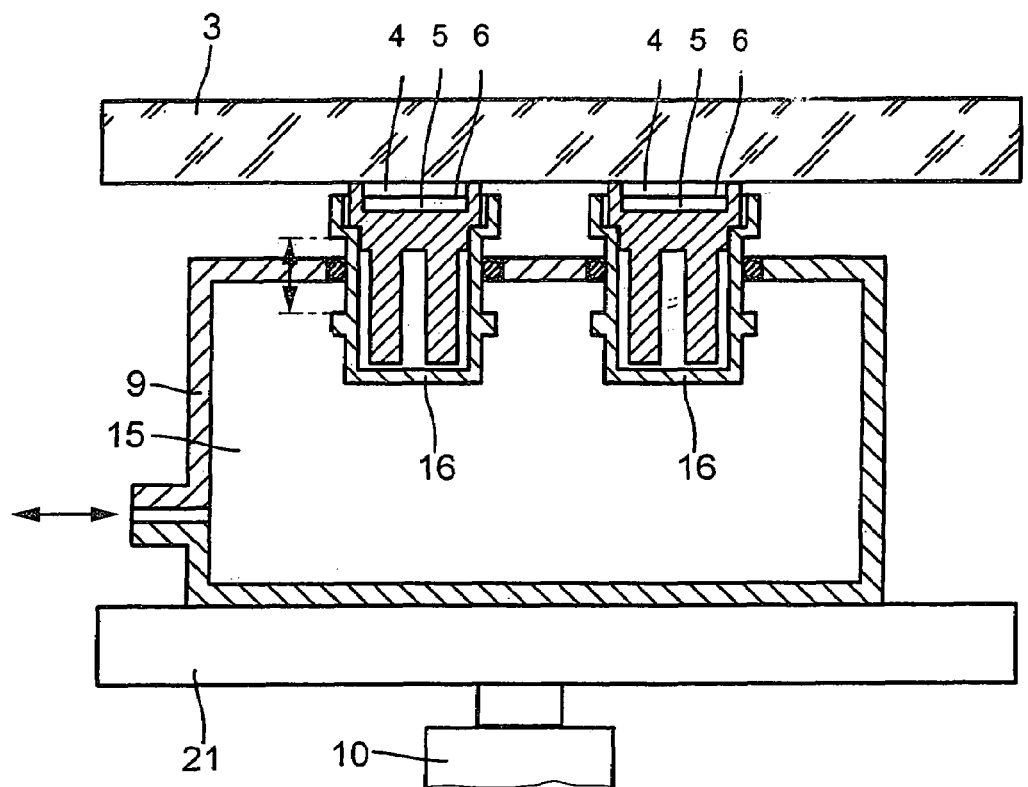
FIG. 1 shows schematically the principle of the arrangement with moveable supporting segments, in a sectional illustration.

FIG. 1 shows an upper pressure plate 3 made from silica glass onto which workpieces 4 and 5, the upper workpiece 4 and the upper pressure plate 3 being transparent to a laser beam (not illustrated) from a laser source. The laser beam is formed in a known way by means of suitable optical means such that it is positioned vertically above the region to be machined and is moved over the latter. This can be performed by appropriate deflecting mirrors, or by moving the laser source itself or the supporting table. The laser beam passes through the upper pressure plate 3 and the upper workpiece 4 such that the laser beam heats up the material in the adhered region 6 between two workpieces, and thereby effects welding of the two workpieces 4 and 5 in this exemplary embodiment. An appropriate mask can be located on the upper pressure plate 3 in order to select the regions to be welded. The two workpieces 4 and 5 are arranged on supporting segments 8 of a lower pressure plate 9. Both the upper pressure plate and the lower pressure plate can, for example, be moved hydraulically or pneumatically by a customary piston/cylinder arrangement. In the present exemplary embodiment, the upper pressure plate 3 is fixed, while, after the arrangement of the workpieces 4, 5 on the respective supporting segments 8, as illustrated in the Figure, the lower pressure plate 9 presses the top sides of the upper workpieces 4 against the upper pressure plate with a fixed holding pressure. The supporting segments 8 mounted moveably in the lower pressure plate 9 can likewise be actuated pneumatically in the vertical direction, for example via a conventional piston/cylinder arrangement, generally denoted as a pressure generator 10.

Depending on the design, the pressure generator can be controlled in this case if needed such that an appropriate higher contact pressure is applied only to the supporting segment 8, which is currently being struck by the laser beam, and not to the remaining other supporting segments 8', 8". As soon as the laser beam passes to the next supporting segment 8', the supporting segment 8 is press-relieved and an increased pressure is correspondingly applied to the supporting segment 8'. It is thereby ensured in this exemplary embodiment that the workpieces are exposed only for the moment of machining to an increased contact pressure which is necessary, for example, for the quality requirements in the case of microstructures and nanostructures at the moment of machining, and so machining that is dimensionally accurate and exact is not possible. In the exemplary embodiment in accordance with FIG. 1, compressed air is applied to the supporting segments 8', 8" after the lower pressure plate 9 has been brought into the vicinity of the upper pressure plate 3 via a pressure generator 10. The individual pressure pistons 16 of the supporting segment 8', 8" are moved in the vertical direction via the pressure chamber 15 and can be adapted to various thicknesses of the workpieces 4, 5, the contact pressure being the same for them all. A controlled selection of individual supporting segments does not take place here.

Figure 2:
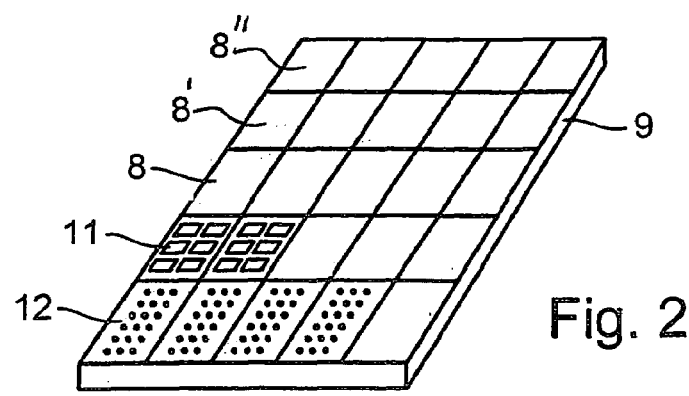
FIG. 2 shows the perspective plan view of a lower pressure plate with supporting segments and individual segment regions.

FIG. 2 shows the perspective view of a lower pressure plate 9 with individual supporting segments 8, in the case of which the supporting segments do not, as illustrated in FIG. 1, form a flat support, but instead only a punctiform one. This can be performed by individual segment regions, that is to say smaller, flat supports 11, or in a punctiform fashion by means of pins or needles 12. The flat segment regions 11 can also be implemented by rollers or other suitable elements, it likewise being possible in the case of the embodiment according to this Figure to apply a contact pressure individually to the individual segment regions, be they in flat form (reference numeral 11) or pins or needles 12. As illustrated in FIG. 1, this can be performed by means of pressure chambers 15 which can, however, be driven separately in relation to individual segment regions 11.

Figure 3:
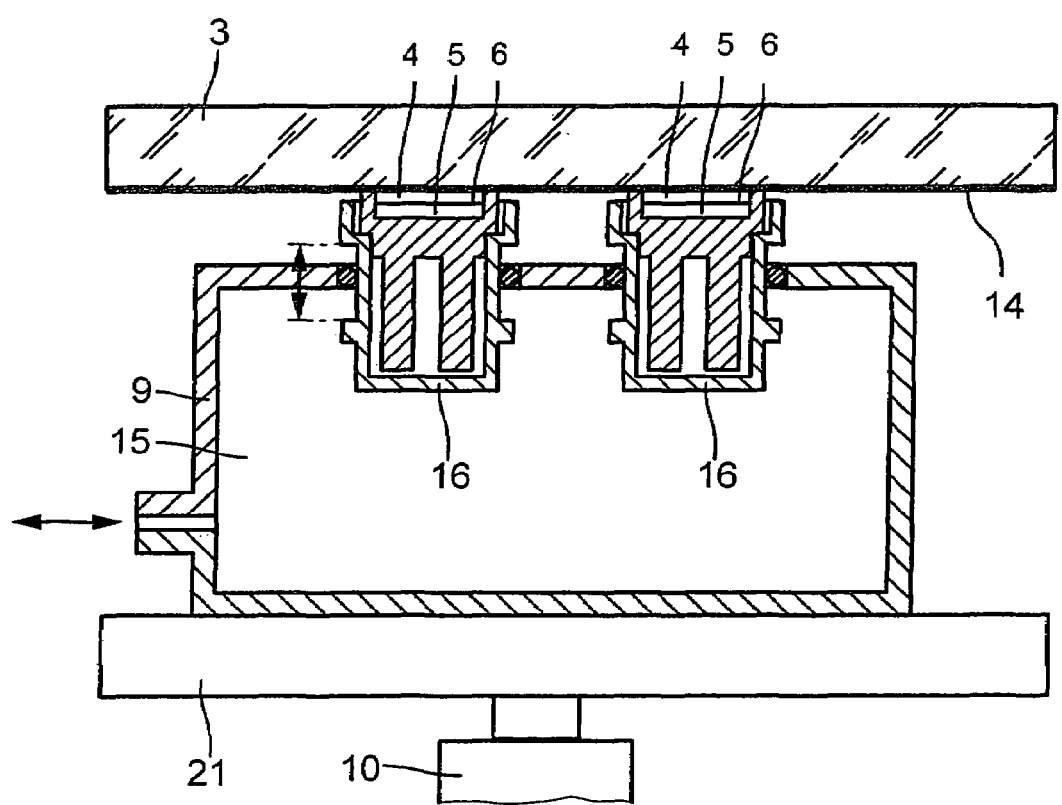
FIG. 3 shows an embodiment with a rigid lower pressure plate and an additional film between the upper pressure plate and the workpieces.

In the exemplary embodiment in accordance with FIG. 3, there is inserted between the upper pressure plate 3 and the top side of the workpieces 4 a film 14 which is transparent to the laser beam and has a thickness of approximately 0.2 to 1 mm and via which tolerance compensation and pressure balancing is achieved after the firm compression of the workpieces 4, 5 between the upper pressure plate 3 such that the contact pressure required during machining can act on all the workpieces. It is thereby possible in some circumstances to save the balancing via the supporting segments that can be moved in the vertical direction, which are illustrated in FIGS. 1 and 3. The film 14 was additionally used in the Figure despite moveable supporting segments, as explained in FIG. 1.

FIG. 4 shows three different operating states of a device having a lower pressure plate 9 with a pressure chamber 15. The pressure chamber 15 has, by way of example, three pressure pistons 16 which project into the pressure chamber in the vertical direction and whose upper end face 17 serves as workpiece support. The pressure plate 9, in turn, is moved in the vertical direction by means of a cylinder 28, the latter having the greater stroke in the vertical direction, as shown in the Figure. FIG. 4A shows the arrangement in the rest position with the level h1. In FIG. 4B, the pressure has been applied, pneumatically or hydraulically, to the cylinder 28, and so the lower pressure plate 9 is already moved close to the upper pressure plate 3 at the height level h2. In FIG. 4C, pressure can then be applied to the pressure chamber 15, and the pressure pistons 16 are moved out of the pressure chamber 15 in the vertical direction. The stroke of the pressure pistons 16 is directed individually in accordance with the thickness of the workpieces resting on the end face 17. Consequently, workpiece tolerances can be compensated so as always to ensure the required contact pressure.

Figure 5A:
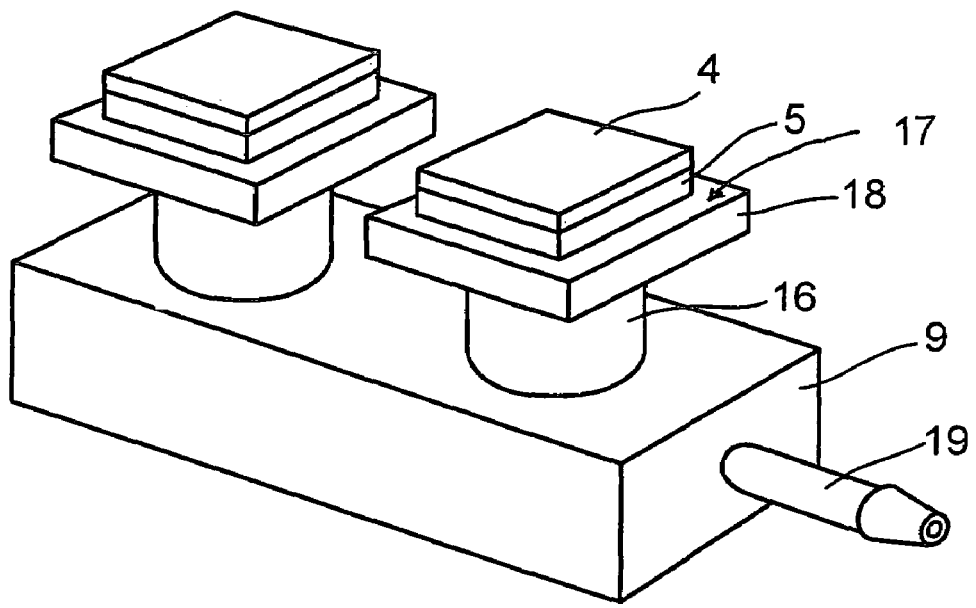
FIG. 5 shows the upper pressure plate with compressed-air chamber with two supporting segments as workpiece support, in a perspective view and in a sectional illustration.
Figure 5B:
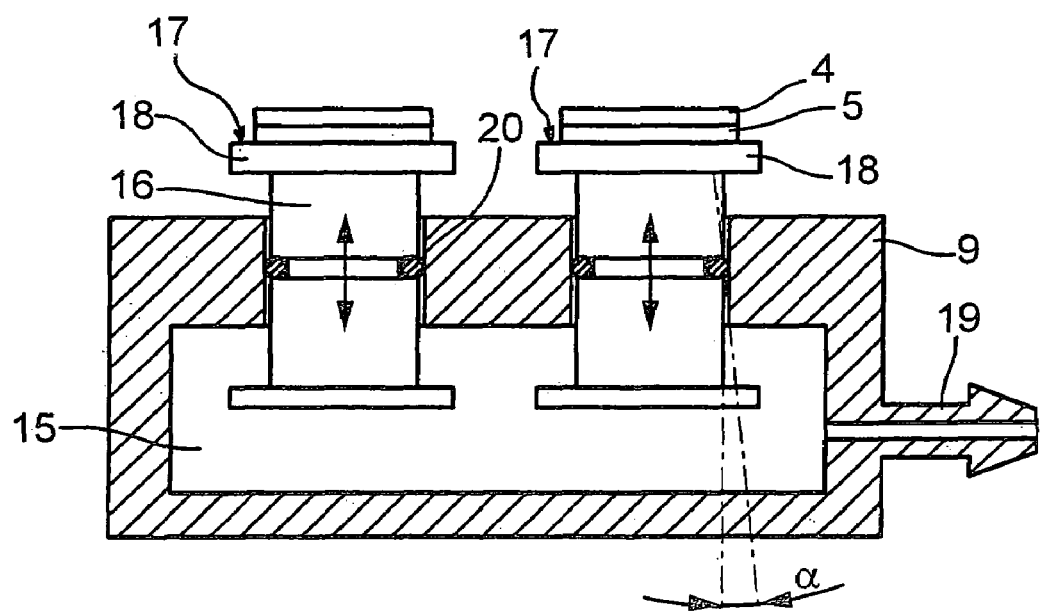

FIG. 5 shows in an enlarged illustration in a perspective representation (FIG. 5A) and in a sectional illustration (FIG. 5B) only the lower pressure plate 9 with the pressure chamber 15 and two pressure pistons 16 on which a workpiece holder 18 is arranged on the end face 17. The workpieces 4, 5 to be welded are located on the workpiece holder 18. A compressed-air connection 19 is located to the side in this example. It is to be seen in FIG. 5B that the pressure pistons 16 are guided in the pressure chamber 15 via seals 20 in such a way that it is possible to make even a small angular adjustment.

FIG. 6A shows the pressure plate 9 on a base plate 21 in another refinement, in cross section. The base plate 21 is illustrated in a perspective view in FIG. 6B, and FIG. 6C illustrates the detail C in an enlarged section. The lower pressure plate 9 once again has a pressure chamber 15 with a pressure piston 16 that bears a workpiece holder 18. Located on the latter are the workpieces 4, 5, which are pressed against the transparent upper pressure plate 3. The lower pressure plate 9 has a through bore 22 to the pressure chamber 15 and rests with the flat underside 23 on the base plate 21. The latter has a compressed-air channel 24 that opens on the top side into a cylindrical counterbore 25. The latter serves to hold a sealing ring 26, as illustrated in FIGS. 6B and 6C. Said ring seals off the surfaces, lying on one another, of the lower pressure plate 9 and the base plate 21 from one another.

In a very highly advantageous and at the same time simple way, this arrangement permits the use of a plurality of lower pressure plates 9 as a workpiece magazine, which plates can be interchanged and thereby be connected immediately to the compressed-air generator.

Figure 7C:
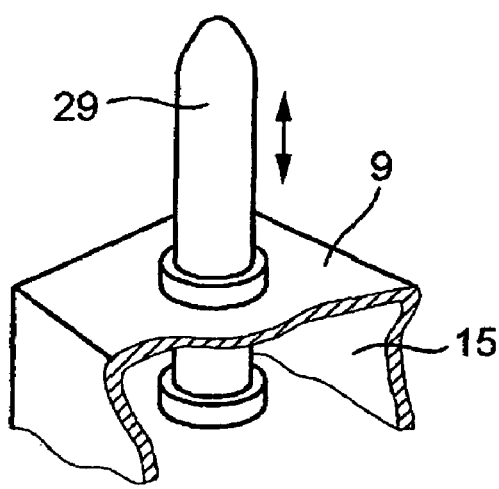
FIG. 7 shows a schematic perspective illustration of the lower pressure plate with pins, and in section with workpieces and an upper pressure plate.
Figure 7C:
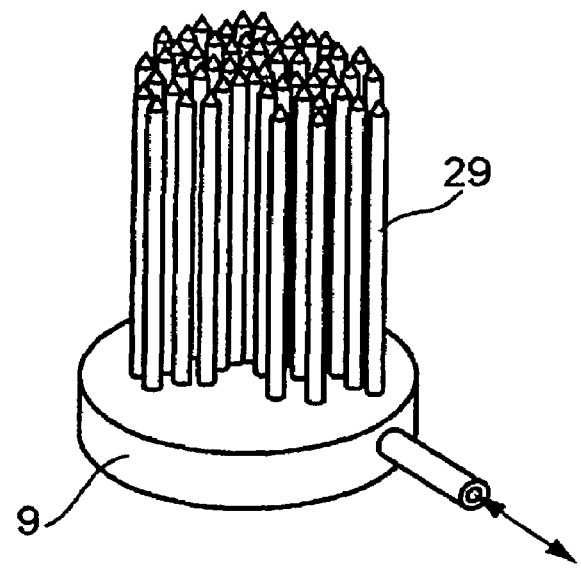
Figure 7C:
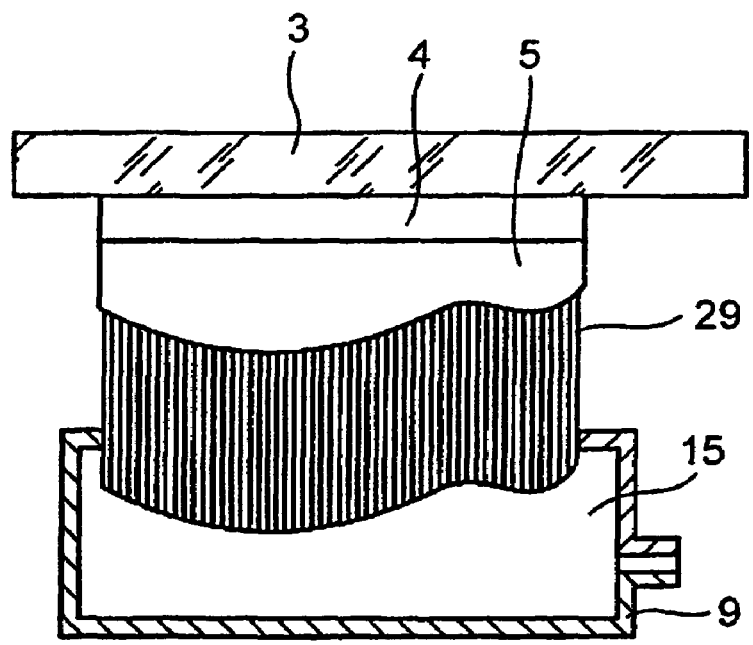

Finally, FIG. 7 shows the supporting segments in the form of pins 29 that are guided moveably individually in the vertical direction in the pressure chamber 15 and—as already explained above—can likewise have compressed air applied to them. FIG. 7A shows an individual pin 29, FIG. 7B shows the lower pressure plate 9 with a multiplicity of pins 29, and FIG. 7C shows a sectional illustration of the arrangement of the pins in the case of the lower workpiece 5 with a contour on the side facing the pins 29. Consequently, workpieces with a structured surface on one side can also be pressed together exactly.

The invention claimed is:

1. A method for machining a plurality of workpieces with a laser beam, comprising:

providing a lower pressure plate having a plurality of movable support segments for supporting a plurality of workpieces to be machined, wherein the support segments are flat or punctiform or include both flat and punctiform, and are movable independently from each other vertically relative to the lower pressure plate;

providing an upper translucent pressure plate whereby the lower and the upper pressure plate are movable vertically toward each other;

selectively pressing the plurality of workpieces arranged on each of the plurality of movable support segments one after another against the upper pressure plate by moving the respective movable supporting segment in a vertical direction in accordance with a desired contact pressure, wherein only the respective workpiece pressed towards the upper pressure plate is exposed to a laser beam; and passing a laser beam from above through the upper pressure plate onto the plurality of workpieces to machine same.

2. The method as claimed in claim 1, wherein the plurality of support segments include individual segment regions movable independently of each other in a vertical direction and are pressed against the workpieces with a desired contact pressure.

3. The method as claimed in claim 1, wherein the plurality of support segments is moved simultaneously in a vertical direction until contact occurs between the workpieces arranged on said support segments and the workpieces are pressed collectively against the upper pressure plate with a first contact pressure to clamp same, and for machining the workpieces with the laser beam a second, substantially higher contact pressure is applied in turn selectively to the respective workpiece exposed to the laser beam.

4. The method as claimed in claim 1, wherein, after the laser beam machining, substituting a second identical lower pressure plate fitted with unfinished workpieces to be machined for the lower pressure plate.

5. Method as claimed in claim 3, wherein the lower plate is provided on the underside with a compressed-air connection and arranged on a base plate with a compressed-air counterpart and pressed against the base plate by the force of the contact pressure pressing the workpieces against the upper pressure plate, and the compressed-air connection is sealed thereby.

6. Method as claimed in claim 4, wherein the lower pressure plate is provided on the underside with a compressed-air connection and arranged on a base plate with a compressed-air counterpart and pressed against the base plate by the force of the contact pressure pressing the workpieces against the upper pressure plate, and the compressed-air connection is sealed thereby.

7. The method as claimed in claim 1, including inserting a translucent elastic plastic film between the upper pressure plate and the workpieces.

8. A device for machining a plurality of workpieces with a laser beam, comprising:

a lower pressure plate having a plurality of movable support segments for supporting a plurality of workpieces to be machined and on an underside a compressed-air opening that is flush with a corresponding compressed-air opening in a base plate, wherein the support segments are flat or punctiform or include both flat and punctiform, and are driven separately from each other and movable independently from each other vertically relative to the lower pressure plate;

a translucent upper pressure plate, whereby the lower and the upper pressure plate are movable vertically toward each other;

a laser for passing a laser beam through the upper pressure plate onto the workpieces;

a pressure generator acting at least at one of the pressure plates for biasing the pressure plates toward each other; and means for moving the movable support segments independently from each other vertically with respect to the lower pressure plate, wherein the workpieces are pressed one after the other or simultaneously against the upper pressure plate at a desired contact pressure, wherein at least two lower plates are provided which are brought alternately into pressure contact with the upper plate, wherein the compressed-air opening in the lower plate is designed as a through bore, and the compressed-air opening in the base plate is designed as a bore with a counterbore for holding a seal.

9. The device as claimed in claim 8, wherein the lower pressure plate includes a pressure chamber for receiving compressed air for moving one or more support segments in the vertical direction.

10. The device as claimed in claim 8, wherein the lower pressure plate includes individual resiliently mounted workpiece supports, and the pressure plate is movable in a vertical direction by a pressure generator.

* * * * *